United States Patent
Harms et al.

(10) Patent No.: US 9,534,459 B2
(45) Date of Patent: Jan. 3, 2017

(54) PUMP ACTUATED VALVE

(71) Applicant: Schlumberger Technology Corporation, Sugar Land, TX (US)

(72) Inventors: Kent Harms, Richmond, TX (US); Albert Hoefel, Sugar Land, TX (US); Stephen Parks, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 69 days.

(21) Appl. No.: 14/359,368

(22) PCT Filed: Nov. 30, 2012

(86) PCT No.: PCT/US2012/067232
§ 371 (c)(1),
(2) Date: May 20, 2014

(87) PCT Pub. No.: WO2013/082386
PCT Pub. Date: Jun. 6, 2013

(65) Prior Publication Data
US 2014/0326512 A1    Nov. 6, 2014

Related U.S. Application Data

(60) Provisional application No. 61/566,058, filed on Dec. 2, 2011.

(51) Int. Cl.
*E21B 21/10* (2006.01)
*E21B 34/06* (2006.01)
(Continued)

(52) U.S. Cl.
CPC .............. *E21B 21/10* (2013.01); *E21B 34/066* (2013.01); *E21B 34/14* (2013.01); *E21B 43/128* (2013.01);
(Continued)

(58) Field of Classification Search
CPC ............................... E21B 21/10; E21B 34/066
See application file for complete search history.

(56) References Cited

U.S. PATENT DOCUMENTS 3,058,227 A * 10/1962 Camp ................... E21B 47/08
33/544.3
4,266,606 A    5/1981 Stone
(Continued)

FOREIGN PATENT DOCUMENTS

| JP | 20100229870 A | 4/2012 |
| WO | 0165061 A1 | 9/2001 |
| WO | 2009138849 A1 | 11/2009 |

OTHER PUBLICATIONS

International Search Report for International Application No. PCT/US2012/067232 dated Mar. 19, 2013.
(Continued)

*Primary Examiner* — Shane Bomar
(74) *Attorney, Agent, or Firm* — David G. Matthews

(57) ABSTRACT

A system includes a valve assembly configured to be disposed within a downhole tool module, a valve of the valve assembly configured to regulate flow of a fluid within the downhole tool module, a pump configured to supply a hydraulic fluid to actuate the valve, and an actuator configured to drive the pump.

11 Claims, 3 Drawing Sheets

(51) Int. Cl.

| | |
|---|---|
| *E21B 34/14* | (2006.01) |
| *E21B 43/12* | (2006.01) |
| *F04B 17/00* | (2006.01) |
| *F04B 17/04* | (2006.01) |
| *F16K 15/02* | (2006.01) |
| *F16K 15/18* | (2006.01) |

(52) U.S. Cl.
CPC ............. *F04B 17/003* (2013.01); *F04B 17/04* (2013.01); *F16K 15/025* (2013.01); *F16K 15/186* (2013.01)

(56) References Cited

U.S. PATENT DOCUMENTS

| | | | |
|---|---|---|---|
| 5,147,185 A * | 9/1992 | Niehaus | E21B 43/121 |
| | | | 417/394 |
| 5,462,114 A * | 10/1995 | Catanese, Jr. | E21B 34/16 |
| | | | 166/53 |
| 6,663,361 B2 | 12/2003 | Kohl | |
| 7,086,486 B2 | 8/2006 | Ravensbergen et al. | |
| 7,111,675 B2 | 9/2006 | Zisk, Jr. | |
| 7,288,085 B2 | 10/2007 | Olsen | |
| 8,220,533 B2 | 7/2012 | Longfield et al. | |
| 2008/0185046 A1 * | 8/2008 | Springett | E21B 33/0355 |
| | | | 137/14 |
| 2009/0311116 A1 | 12/2009 | Bai et al. | |
| 2010/0012313 A1 | 1/2010 | Longfield et al. | |
| 2010/0018829 A1 | 1/2010 | Neelakantan et al. | |
| 2011/0100641 A1 * | 5/2011 | Briquet | E21B 33/1275 |
| | | | 166/373 |
| 2011/0127044 A1 * | 6/2011 | Radford | E21B 10/322 |
| | | | 166/373 |

OTHER PUBLICATIONS

"Reed Valve." Wikipedia: The Free Encyclopedia. Wikimedia Foundation, Inc., Feb. 15, 2014. Web. May 15, 2014. http://en.wikipedia.org/wiki/Reed_valve.

* cited by examiner

PUMP ACTUATED VALVE

BACKGROUND

The present disclosure relates generally to drilling systems and more particularly to downhole tools.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wells are generally drilled into the ground or ocean bed to recover natural deposits of oil and gas, as well as other desirable materials that are trapped in geological formations in the Earth's crust. A well is typically drilled using a drill bit attached to the lower end of a "drill string." Drilling fluid, or "mud," is typically pumped down through the drill string to the drill bit. The drilling fluid lubricates and cools the drill bit, and it carries drill cuttings back to the surface in an annulus between the drill string and the borehole wall.

For successful oil and gas exploration, it is beneficial to have information about the subsurface formations that are penetrated by a borehole. For example, one aspect of standard formation evaluation relates to measurements of the formation pressure and formation permeability. These measurements are valuable for predicting the production capacity and production lifetime of a subsurface formation.

One technique for measuring formation properties includes lowering a "wireline" tool into the well to measure formation properties. A wireline tool is a measurement tool that is suspended from a wire as it is lowered into a well so that it can measure formation properties at desired depths. A typical wireline tool may include a probe or packer inlet that may be pressed against the borehole wall to establish fluid communication with the formation. This type of wireline tool is often called a "formation tester." A formation tester measures the pressure of the formation fluids and generates a pressure pulse, which is used to determine the formation permeability. The formation tester tool also typically withdraws a sample of the formation fluid for later analysis.

In order to use a wireline tool, whether the tool is a resistivity, sampling, porosity, or formation testing tool, the drill string is removed from the well so that the tool can be lowered into the well. This is called a "trip" downhole. Further, wireline tools must be lowered to the zone of interest, generally at or near the bottom of the hole. A combination of removing the drill string and lowering the wireline tools downhole are time-consuming measures and can take up to several hours, depending upon the depth of the borehole. Because of the expense and rig time involved to "trip" the drill pipe and lower the wireline tools down the borehole, wireline tools are generally used only when the information is greatly desired, or when the drill string is tripped for another reason, such as changing the drill bit.

As an improvement to wireline technology, techniques for measuring formation properties using tools and devices that are positioned near the drill bit in a drilling system have been developed. Thus, formation measurements are made during the drilling process, and the terminology generally used in the art is "MWD" (measurement-while-drilling) and "LWD" (logging-while-drilling). MWD typically refers to measuring the drill bit trajectory, as well as borehole temperature and pressure, while LWD typically refers to measuring formation parameters or properties, such as resistivity, porosity, permeability, and sonic velocity, among others. Real-time data, such as the formation pressure, allows the drilling entity to make decisions about drilling mud weight and composition, as well as decisions about drilling rate and weight-on-bit, during the drilling process.

Downhole tools can be complex and inefficient. For example, multiple moving parts involved in a formation testing tool, such as MWD and LWD tools, can result in less than optimal performance. Further, at significant depths, substantial hydrostatic pressure and high temperatures are experienced, thereby further complicating matters. Still further, formation testing tools are operated under a wide variety of conditions and parameters that are related to both the formation and the drilling conditions. Therefore, there is a need for improved downhole formation evaluation tools and improved techniques for operating and controlling downhole formation evaluation tools so that these tools are more reliable, efficient, and adaptable to formation and mud circulation conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first embodiment, a system includes a valve assembly configured to be disposed within a downhole tool module, a valve of the valve assembly configured to regulate flow of a fluid within the downhole tool module, a pump configured to supply a hydraulic fluid to actuate the valve, and an actuator configured to drive the pump.

In another embodiment, a drilling system includes a valve assembly disposed within a downhole tool module, a valve of the valve assembly, a first pump configured to supply a hydraulic fluid to actuate the valve in a first position, a first actuator configured to drive the first pump, a second pump configured to supply the hydraulic fluid to actuate the valve in a second position, a second actuator configured to drive the second pump, and a recirculation circuit configured to re-circulate the hydraulic fluid within the valve assembly to a fluid reservoir.

In a further embodiment, a system a downhole tool module configured to flow a fluid, and a valve assembly disposed within the downhole tool module and configured to regulate flow of the fluid. The valve assembly includes a valve configured to block flow of the fluid in a first valve position and enable flow of the fluid in a second valve position, wherein the valve comprises a spring configured to bias the valve toward the first valve position, a first pump configured to pump a hydraulic fluid to the valve to actuate the valve into the second valve position, and a first actuator configured to drive the first pump, wherein the first actuator comprises a first solenoid or a first piezoelectric stack.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
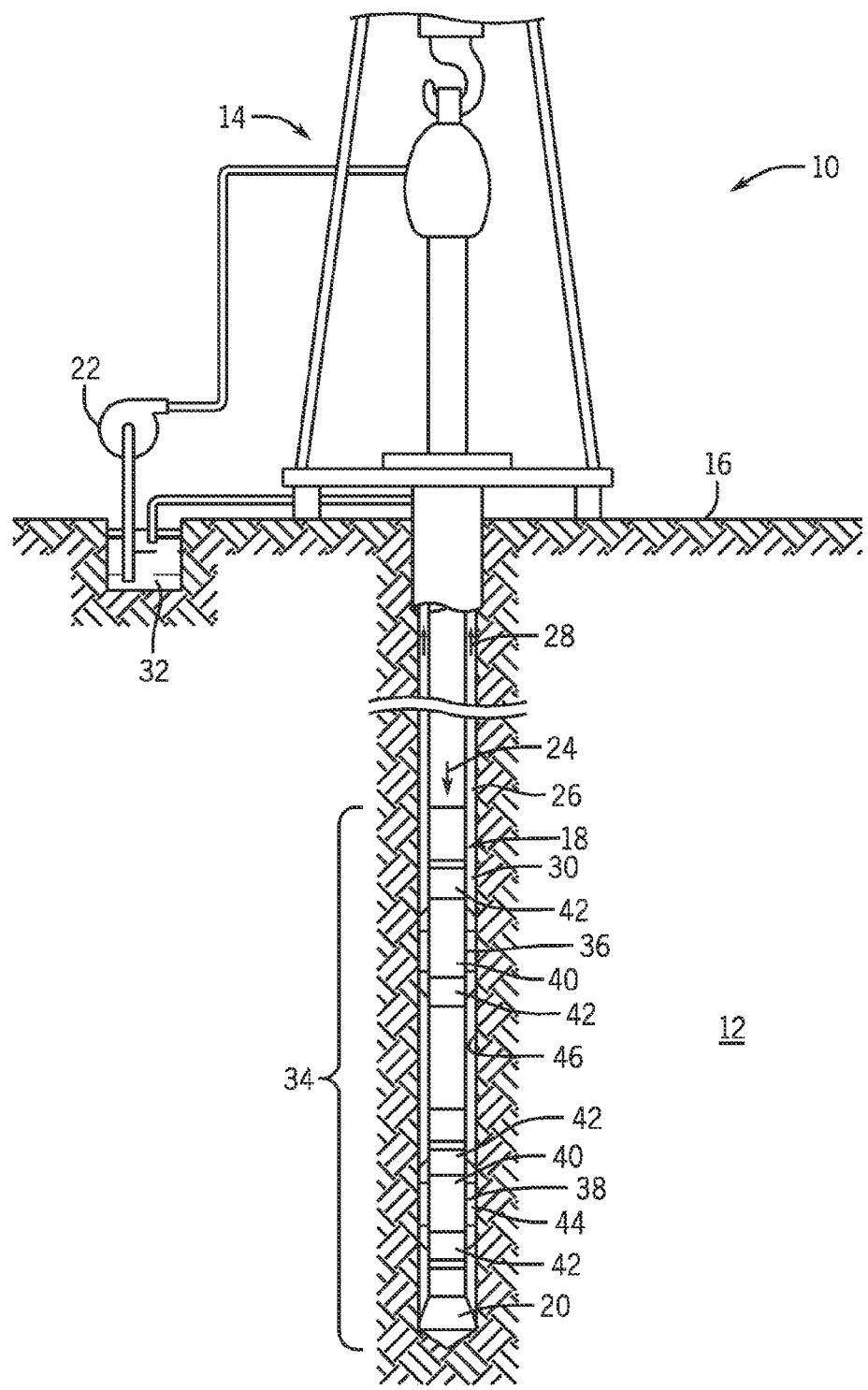
FIG. 1 is a partial cross sectional view of a drilling system used to drill a well through subsurface formations, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to systems for actuating a valve (e.g., a mud valve) in a valve assembly of a downhole tool. For example, in certain embodiments, a valve assembly may be actuated to control a flow of fluid through the downhole tool. The valve assembly may be a self-contained subassembly that may be placed in the downhole tool as needed to switch routing of a fluid, open or close sampling chambers, control exit ports, and so forth. As discussed in detail below, the valve assembly includes a valve (e.g., a mud valve) that is actuated by an actuator or other mechanism that may be small, compact, use low power, and so forth. For example, the actuator may be a solenoid or a piezoelectric element (e.g., a single-crystal piezoelectric element or a piezoelectric stack) that actuates a pump of the valve assembly. According to certain embodiments, the pump may be a miniature, micro, or compact pump that is smaller than traditional pumps employed in downhole tools. As the actuator drives the pump, the pump may generate pressure and volumetric displacement with a hydraulic fluid to actuate the valve (e.g., a mud valve). As discussed below, the actuator of the valve assembly (e.g., solenoid or piezoelectric element/stack) may enable generation of high forces, thereby enabling high hydraulic pressure generation with the pump, while utilizing relatively little power and space within the downhole tool. While the valve assembly may be located anywhere within the downhole tool, in certain embodiments, the valve assembly is positioned along an internal flowline, proximate to a flowline exit, and/or proximate to sampling tubes of the downhole tool.

FIG. 1 illustrates a drilling system 10 used to drill a well through subsurface formations 12. A drilling rig 14 at the surface 16 is used to rotate a drill string 18 that includes a drill bit 20 at its lower end. As the drill bit 20 is rotated, a "mud" pump 22 is used to pump drilling fluid, commonly referred to as "mud" or "drilling mud," downward through the drill string 18 in the direction of the arrow 24 to the drill bit 20. The mud, which is used to cool and lubricate the drill bit 20, exits the drill string 18 through ports (not shown) in the drill bit 20. The mud then carries drill cuttings away from the bottom of the borehole 26 as it flows back to the surface 16, as shown by the arrows 28, through the annulus 30 between the drill string 18 and the formation 12. While a drill string 18 is illustrated in FIG. 1, it will be understood that the embodiments described herein are applicable to work strings and pipe strings as well. At the surface 16, the return mud is filtered and conveyed back to a mud pit 32 for reuse.

As illustrated in FIG. 1, the lower end of the drill string 18 includes a bottom-hole assembly ("BHA") 34 that includes the drill bit 20, as well as a plurality of drill collars 36, 38 that may include various instruments and subassemblies, such as sample-while-drilling ("SWD") tools that include sensors, telemetry equipment, pumps, sample chambers, valves (e.g., mud valves), and so forth. For example, the drill collars 36, 38 may include logging-while-drilling ("LWD") modules 40 and/or measurement-while drilling ("MWD") modules 42. The LWD modules 40 of FIG. 1 are each housed in a special type of drill collar 36, 38, and each contains any number of logging tools and/or fluid sampling devices. The LWD modules 40 include capabilities for measuring, processing and/or storing information, as well as for communicating with the MWD modules 42 and/or directly with the surface equipment such as a logging and control computer.

In certain embodiments, the SWD tools may also include or be disposed within a centralizer or stabilizer 44. For example, the centralizer/stabilizer 44 may include blades that are in contact with the borehole wall 46 as shown in FIG. 1 to limit "wobble" of the drill bit 20. "Wobble" is the tendency of the drill string 18, as it rotates, to deviate from the vertical axis of the borehole 26 and cause the drill bit 20 to change direction. Because the centralizer/stabilizer 44 is already in contact with the borehole wall 46, a probe is extended a relatively small distance from the SWD tool to establish fluid communication with the formation 12. It will be understood that a formation probe may be disposed in locations other than in the centralizer/stabilizer 44 without departing from the scope of the presently disclosed embodiments.

Figure 2:
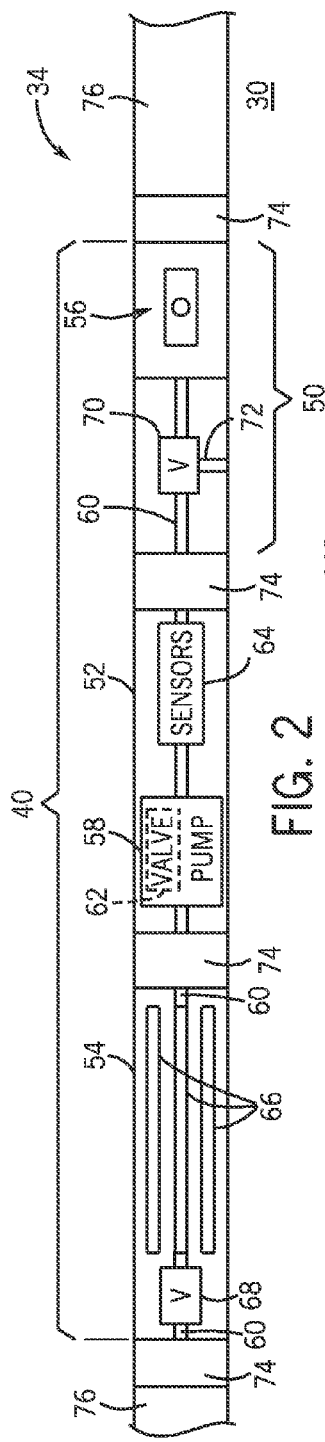
FIG. 2 is a schematic diagram of downhole drilling equipment used to sample a formation, in accordance with an embodiment of the present disclosure.

FIG. 2 is a schematic diagram of an embodiment of downhole drilling equipment that may form part of the BHA 34 of FIG. 1. Specifically, the illustrated downhole drilling equipment includes a LWD tool 40 that may be used to collect fluid samples from the formation 12 during the drilling process. The tool 40 includes a probe module 50, a pump-out module 52, and a sample carrier module 54, which work together to collect formation fluid samples. The probe module 50 includes probe 56, which includes an extendable fluid communication line designed to engage the formation 12 and to communicate fluid samples from the formation 12 into the tool 40. In addition to the probe 56, the probe module 50 includes certain electronics, batteries, and/or hydraulic components used to operate the probe 56. Further, although the probe module 50 is described herein as including a single extendable probe 56, in other embodiments, the techniques described herein may be employed with other types of probes, such as dual probe modules, straddle packer probe modules, or single packer probe modules, among others.

The pump-out module 52 is configured to provide hydraulic power to direct sampling fluid from the probe module 50 through the tool 40 and into the sample carrier module 54. In certain embodiments, the pump-out module 52 includes a pump 58 for pumping formation sample fluid from the probe module 50 to the sample carrier module 54 and/or out of the tool 40. More specifically, the pump 58 is configured to pump a fluid through an internal flowline 60 extending through the tool 40. In an embodiment, the pump 58 may include an electromechanical pump, which operates via a piston displacement unit (DU) driven by one or more actuating mechanisms, such the actuating mechanisms described below with respect to FIGS. 3-5 (e.g., actuation mechanism 106). Additionally, one or more mud valves 62 (e.g., a mud check valve) may be employed to direct pumping fluid in and out of chambers of the DU, thereby allowing continuous pumping of formation fluid, even as the DU switches direction. In certain embodiments, power may be supplied to the pump 58 via a dedicated mud turbine/alternator system. In addition to the pump 58, the pump-out module 52 may include a number of sensors 64 used to monitor one or more parameters of the fluid (e.g., drilling mud or sample fluid) moving through the internal flowline 60 of the pump-out module 52. For example, the sensors 64 may include two pressure gauges: one to monitor an inlet pressure (e.g., pressure of the probe module 50), and another to monitor an outlet pressure (e.g., pressure of fluid entering the sample carrier module 54). Although the pump-out module 52 is included in the illustrated embodiment of the tool 40, it should be noted that the tool may operate without a separate pump-out module 52. For example, certain components internal to the illustrated pump-out module 52 may be located in other sections of the tool 40. As another example, the tool 40 may sample the well formation via the probe module 50 without using a pump to flow fluid through the internal flowline 60 of the tool 40. For example, the probe module 50 may be employed to take formation pressure measurements by withdrawing a small portion of formation fluid into the probe 56, and then expelling the formation fluid to the wellbore.

Once the formation fluid is taken into the probe module 50, the pump 58 urges the formation fluid through the internal flowline 60 of the tool 40 and toward the sample carrier module 54. The sample carrier module 54, in general, includes three sample carriers 66, which may be 450-cc sample bottles configured to receive and store the sample fluid (samples of the well formation taken by the probe module 50). The sample carrier module 54 may then be brought to the surface for testing of the fluid samples. One or more valves 68 are employed to open the sample carriers 66, usually one at a time, to receive the sample fluid pumped through the tool 40 and to close the sample carrier 66 when they are filled to a desired level. As discussed in detail below, the valves 68 may be operated by actuating mechanisms (e.g., actuating mechanism 106 shown in FIG. 3) that utilize low space and power. In certain embodiments, the tool 40 may operate without the illustrated sample carrier module 54.

The LWD tool 40 may further utilize the probe module 50 to obtain formation pressure measurements. In these embodiments, the LWD tool 40 may include sensors (e.g., sensors 64) for determining properties of the formation fluid, which may be drawn into the probe module 50 and then released to the wellbore.

The tool 40 may further include other valves (e.g., mud valves). In addition to the valves 62 and 68 mentioned above, the tool 40 may include a valve 70 disposed along the internal flowline 60 and configured to regulate fluid flow within the internal flowline 60. In certain embodiments, the valve 70 is configured to regulate fluid flow through an exit port 72 of the internal flowline 60, which may extend from the internal flowline 60 to another internal flowline, an internal volume of the tool 40, or the annulus 30 surrounding the tool 40.

The valves of the tool 40 (e.g., valves 62, 68, and/or 70) may include valve assemblies that utilize low power and space. For example, valve assemblies may include a valve (e.g., a mud valve) that is actuated by a pump (e.g., a pump) powered by an actuator, such as a solenoid or piezoelectric element (e.g., a single piezoelectric element or a piezoelectric stack). As discussed in detail below, such configurations may enable the use of relatively little power and space while enabling the generation of elevated hydraulic pressure for actuating the valve. Furthermore, the valve assemblies described below may be positioned and used in other locations within the tool 40 (e.g., in a micro-fluidics sensor module, as a relief valve, etc.) or with other downhole tools, such as pressure, sampling, and wireline tools. While the embodiments discussed below are described as having one or more pumps, other embodiments of the valve assemblies may include any type of pump suitable for use with little power and space.

As previously discussed, the tool 40 represents only a portion of the BHA 34 and the entire drill string 18. As the drill string 18 is assembled at the surface 16, the modules of the tool 40 are connected via field joints 74. The field joints 74 represent rugged connections between drilling equipment that may be assembled at the well site. The field joints 74 may facilitate one or more rotatable electrical and/or hydraulic connections. Accordingly, the field joints 74 may be specially designed to provide electrical communication, sampling fluid communication, and/or hydraulic fluid communication between the probe module 50, the pump-out module 52, the sample carrier module 54, and other drilling equipment 76. The other drilling equipment 76 may include other SWD modules, drill collars, or other drill string components. In some embodiments, the other drilling equipment 76 may include additional modules of the same tool 40, such as another pump-out module 52 on the other side of the probe module 52, additional sample carrier modules 54, and so forth. Since the field joints 74 provide rotatable connections between these modules, the modules may be positioned in any orientation relative to each other without fluid and/or electricity flowing to an undesired location.

Figure 3:
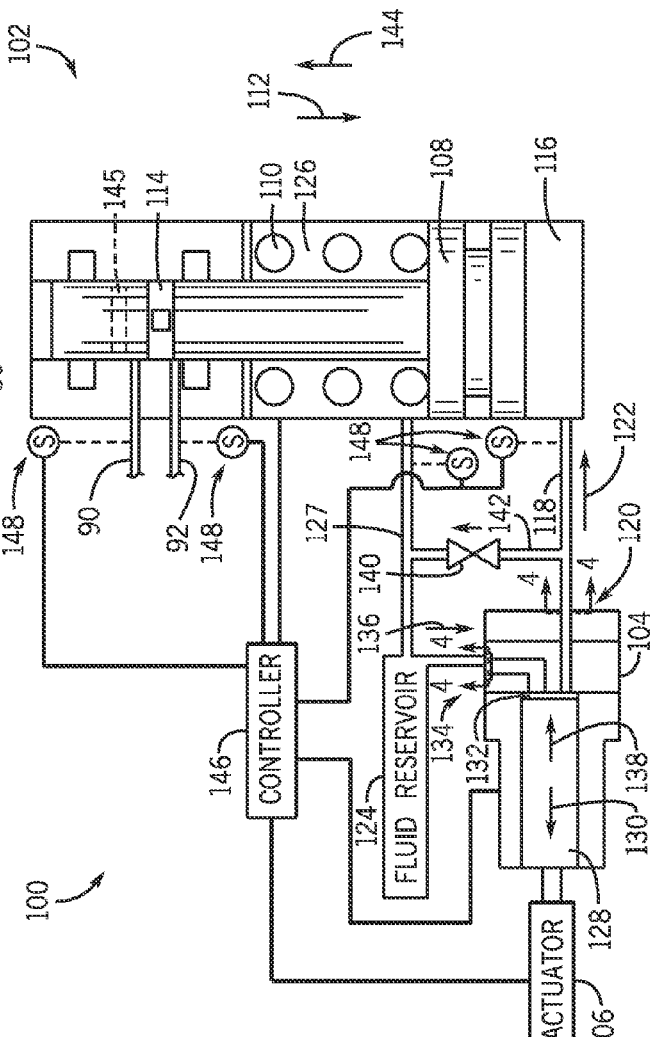
FIG. 3 is a schematic diagram of a valve assembly used in downhole drilling equipment, in accordance with an embodiment of the present disclosure.

FIG. 3 is a schematic diagram of a valve assembly 100 that may be used in downhole drilling equipment, in accordance with present embodiments. For example, in certain embodiments, the valve assembly 100 may be included with one or more of the valves 62, 68, and 70. In the illustrated embodiment, the valve assembly 100 regulates fluid flow between a first flowline 90 (e.g., a first mud line) and a second flowline 92 (e.g., a second mud line). As shown, the valve assembly 100 includes a valve 102 (e.g., a mud valve) that is actuated by a pump 104 and an actuator 106. More specifically, the valve 102 includes a piston 108 that is driven or actuated by a pressure (e.g., hydraulic pressure) generated by the pump 104. As the piston 108 is driven or actuated from one position to another, the valve 102 is opened or closed. Additionally, the valve 102 includes a spring 110, which biases the piston 108 towards one position. More specifically, in the illustrated embodiment, the spring 110 biases the piston 108 such that the valve 102 is in a normally closed position. That is, the spring 110, when uncompressed, biases the piston 108 in a direction 112, thereby isolating the first flowline 90 from the second flowline 92 with a seal 114 and blocking fluid flow from the first flowline 90 to the second flowline 92. However, other embodiments of the valve 102 may not include the spring 110.

A piston chamber 116 of the valve 102 is coupled to a conduit 118 that extends from an outlet 120 of the pump 104. In operation, when the pump 104 is actuated by the actuator 106, the pump 104 pumps a hydraulic fluid into the piston chamber 116, as indicated by arrow 122, thereby generating an elevated pressure within the piston chamber 116 of the valve 102. While the illustrated embodiment shows one pump 104 and one actuator 106, other embodiments may include multiple pumps 104 and actuators 106. For example, in certain embodiments, multiple pumps 104 may be arranged in series or parallel to increase pressure output and/or flow rate of the hydraulic fluid. As described in detail below, the hydraulic fluid may be oil supplied by a fluid reservoir 124. Furthermore, a spring cavity 126 of the valve 102, which houses the spring 110, is fluidly coupled to the fluid reservoir 124 by a conduit 127. As shown, the spring cavity 126 is disposed on the opposite side of the piston 108 as the piston chamber 116. In operation, when the pump 104 is not pumping hydraulic fluid (e.g., oil) into the piston chamber 116 (e.g., when the pump is not actuated by the actuator 106), the pressure in the piston chamber 116 may be approximately equal to the pressure in the spring cavity 126. Accordingly, the spring 110 may be uncompressed and the piston 108 may be biased in the direction 112. Thus, the valve 102 is in the closed position with the seal 114 isolating the first flowline 90 and the second flowline 92 and blocking fluid flow through the valve 102.

As mentioned above, the pump 104 actuates the valve 102 by supplying hydraulic fluid (e.g., oil) at an elevated pressure to the piston chamber 116 of the valve 102. The pump 104 includes a piston 128 (e.g., a tight fit piston) that is driven or reciprocated by the actuator 106. In certain embodiments, the actuator 106 may be a solenoid or a piezoelectric element, such as a piezoelectric stack (i.e., a stack of multiple piezoelectric elements). As such, the actuator 106 may be capable of providing high peak forces while using low power (e.g., approximately 10 watts or less). Additionally, such actuators 106 may be relatively compact and small in size.

As the piston 128 of the pump 104 is reciprocated by the actuator 106, hydraulic fluid (e.g., oil) from the fluid reservoir 124 is pumped into the piston chamber 116 of the valve 102. Specifically, when the piston 128 is stroked in a direction 130, hydraulic fluid is drawn into a compression chamber 132 of the pump 104 through an inlet 134 of the pump 104, as indicated by arrow 136. With the compression chamber 132 filled with hydraulic fluid, the actuator 106 then strokes the piston 128 in a direction 138. As a result, the hydraulic fluid is pumped out of the compression chamber 132 of the pump 104 and into the piston chamber 116 of the valve 102.

The inlet 134 of the pump 104 includes a reed valve, check valve, or other mechanism that enables unidirectional flow. As such, the reed valve positioned at the inlet 134 of the pump 104 enables flow of hydraulic fluid from the fluid reservoir 124 into the compression chamber 132 (e.g., when the piston 128 strokes in the direction 130), but blocks flow of hydraulic fluid from the compression chamber 132 to the fluid reservoir 124 (e.g., when the piston 128 strokes in the direction 138). Similarly, the outlet 120 of the pump 104 includes a reed valve, check valve, or other mechanism that enables unidirectional flow. As such, the reed valve positioned at the outlet 120 of the pump 104 enables flow of hydraulic fluid from the compression chamber 132 to the piston chamber 116 (e.g., when the piston 128 strokes in the direction 138), but blocks flow of hydraulic fluid from the piston chamber 116 to the compression chamber 132 (e.g., when the piston 128 strokes in the direction 130).

The valve assembly 100 also includes a restrictor 140 positioned along a conduit 142 extending between the conduit 118 and the conduit 127. In certain embodiments, the restrictor 140 may be a slotted disc and spin chamber style restrictor, such as a Visco Jet restrictor and/or a timing JEVA, generally available from The Lee Company of Westbrook, Conn. The restrictor 140 slowly leaks hydraulic fluid from the conduit 118 to the conduit 127 as pressure from the hydraulic fluid builds in the conduit 118 and the piston chamber 116. However, the amount of leakage allowed by the restrictor 140 is not sufficient to block the actuation of the valve 102. For example, as discussed above, to open the valve 102, the actuator 106 drives the pump 104, and the pump 104 delivers hydraulic fluid to the piston chamber 116 of the valve 102. As pressure from the hydraulic fluid builds in the piston chamber 116, the pressure acting on the piston 108 forces the piston 108 in a direction 144, thereby compressing the spring 110 and moving the seal 114 into a position 145. As a result, the first flowline 90 and the second flowline 92 are fluidly coupled and the valve 102 is opened. To close the valve 102, the actuator 106 stops driving the pump 104, and hydraulic fluid is no longer pumped into the piston chamber 116 through the conduit 118. With hydraulic fluid no longer being pumped into the piston chamber 116 through the conduit 118, the remaining pressurized hydraulic fluid within the conduit 118 and the piston chamber 116 may slowly leak across the restrictor 140 to the conduit 127 and back into the fluid reservoir 124. As a result, the pressure differential between the conduit 118 and the conduit 127 may reach equilibrium. That is, the pressure differential between the piston chamber 116 and the spring cavity 126 may reach equilibrium. Therefore, the spring 110 may decompress, thereby driving the piston 108 and the seal 114 back to the position shown in FIG. 3 and closing the valve 102. In other words, the inclusion of the restrictor 140 along the conduit 142 enables the resetting (e.g., closing) of the valve 102.

Furthermore, the valve assembly 100 includes a controller 146, which may be configured to regulate operation of one or more components of the valve assembly 100. For example, the controller 146 may regulate operation of the actuator 106 (e.g., a solenoid or piezoelectric element). Additionally, the controller 146 may regulate operation of the various components of the valve assembly 100 based on feedback from components of the valve assembly 100. In one embodiment, the controller 146 may regulate operation of certain components of the valve assembly 100 based on one or more measured parameters relating to operation of the valve assembly 100. For example, the parameters may be measured by sensors 148 (e.g., position sensors, flow sensors, etc.) that may detect a position of the valve 102 (e.g., a position of the seal 114) or a position of the actuator 106. Similarly, the sensors 148 may detect a fluid flow rate within the conduit 118, the conduit 127, the first flowline 90, the second flowline 92, and so forth. Additionally, the controller 146 may receive feedback regarding operation of the pump 104 (e.g., stroke distance of the piston 128, reciprocation frequency, peak power, hydraulic output pressure, etc.). Furthermore, the controller 146 may be configured to regulate operation of one or more components of the valve assembly 100 automatically, based on user input, or both.

Figures 4, 5:
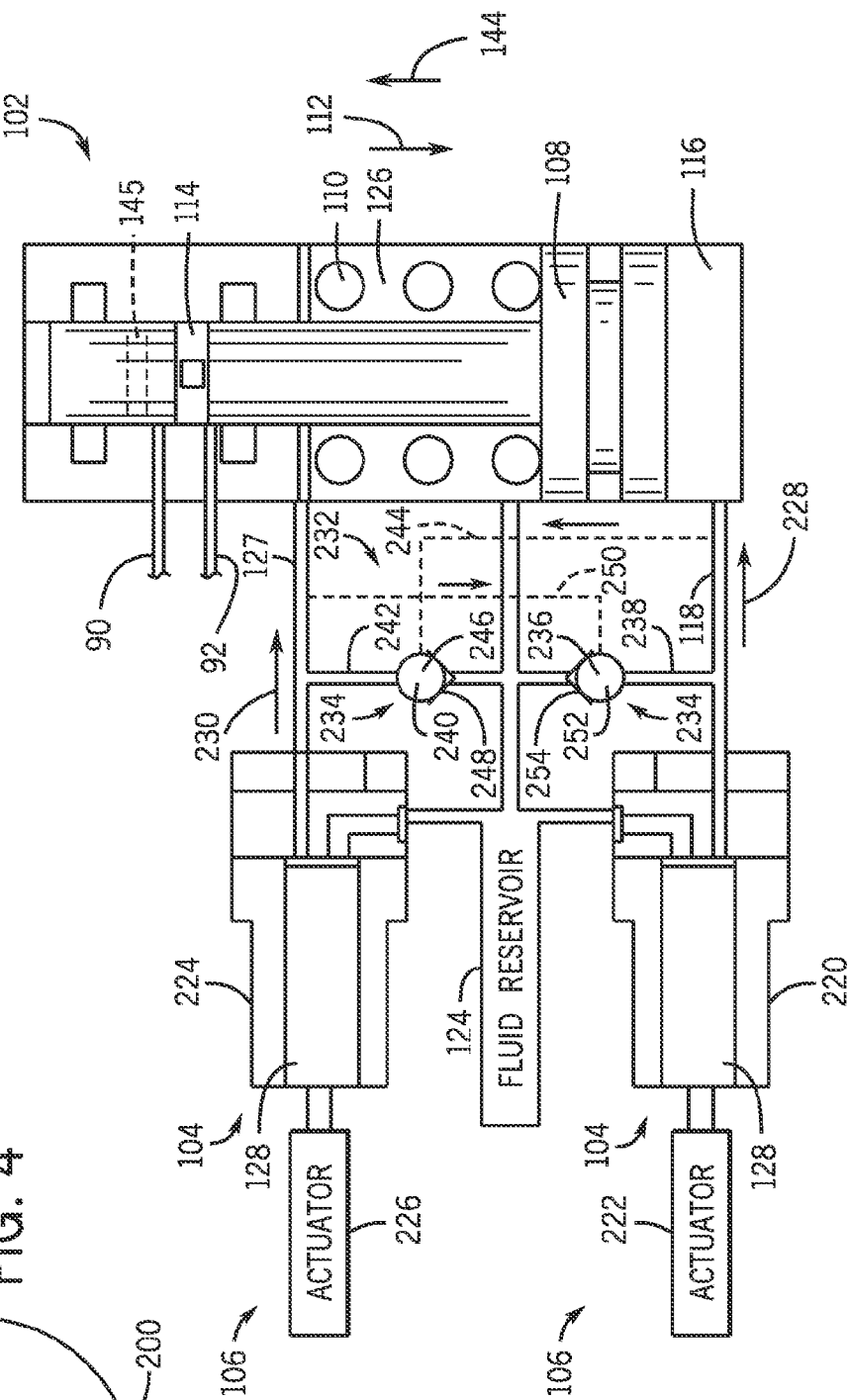
FIG. 4 is an axial view of a reed valve of a valve assembly used in downhole drilling equipment, in accordance with an embodiment of the present disclosure.
FIG. 5 is a schematic diagram a valve assembly used in downhole drilling equipment, in accordance with an embodiment of the present disclosure.

FIG. 4 is an axial view of a reed valve 200 (e.g., a reed valve disk), which may be positioned at the inlet 134 or the outlet 120 of the pump 104. As described above, the pump 104 includes reed valves 200 or other mechanisms enabling unidirectional flow into or out of the compression chamber 132 of the pump 104. More specifically, the reed valve 200 opens or closes under a differential pressure across the reed valve 200. In the illustrated embodiment, the reed valve 200 includes a flap 202, which may flex to allow flow in one direction or another through a hole 204 of the reed valve 200. For example, the flap 202 of the reed valve 200 positioned at the inlet 134 of the pump 104 may flex open when the piston 128 is drawn out (e.g., in the direction 130 shown in FIG. 3) and a vacuum is created within the compression chamber 132 of the pump 104. With the flap 202 flexed open, a hydraulic fluid (e.g., oil) may flow into the compression chamber 132 from the fluid reservoir 124. Conversely, the flap 202 of the reed valve 200 positioned at the inlet 134 of the pump 104 may close when the piston 128 is driven in (e.g., in the direction 138 shown in FIG. 3) and a pressure is created within the compression chamber 132. Consequently, fluid flow may be blocked from exiting the compression chamber 132 through the inlet 134. The inverse is true for the flap 202 of the reed valve 200 positioned at the outlet 120 of the pump 104. More specifically, the flap 202 flexes open, thereby enabling a fluid flow to exit the pump 104 through the outlet 120, when a pressure is created within the compression chamber 132, and the flap 202 closes, thereby blocking fluid flow into the compression chamber 132 through the outlet 120, when a vacuum is created within the compression chamber 132 of the pump 104.

FIG. 5 is a schematic diagram of another embodiment of the valve assembly 100 that may be used in downhole equipment. As discussed above, the valve assembly 100 may be included with one or more of the valves 62, 68, and 70 shown in FIG. 2. The illustrated embodiment includes similar elements and element numbers as the embodiment shown in FIG. 3. Additionally, the illustrated embodiment of FIG. 5 includes two pumps 104 driven by two actuators 106. That is, the valve assembly 100 includes a first pump 220 driven by a first actuator 222 and a second pump 224 driven by a second actuator 226. As similarly discussed above, the first actuator 222 and the second actuator 226 may be solenoids, piezoelectric elements (e.g., a single piezoelectric element or a piezoelectric stack), or other actuating mechanisms that use low power (e.g., less than 10 watts) and produce high forces. In the manner described below, the first pump 220 and the first actuator 222 operate to actuate the valve 102 in a first position (e.g., an open position), and the second pump 224 and the second actuator 226 operate to actuate the valve 102 in a second position (e.g., a closed position).

As discussed in detail above, the valve 102 includes the spring 110 disposed within the spring cavity 126 on one side of the piston 108, and the spring 110 biases the piston 108 toward a closed position. To actuate (e.g., open) the valve 102, the first pump 220 may supply a pressurized hydraulic fluid (e.g., oil) from the fluid reservoir 124 to the piston chamber 116 of the valve 102, as indicated by arrow 228. Specifically, in the manner described above, the actuator 222 drives or reciprocates the piston 128 of the first pump 220, thereby producing and delivering pressurized hydraulic fluid through the conduit to the piston chamber 116 of the valve 102. As the pressure within the piston chamber 116 increases, the force of the pressurized hydraulic fluid acting on the piston 108 overcomes the biasing force of the spring 110 and actuates the piston 108 and the seal 114 in the direction 144. For example, the seal 114 may be translated to the position 146, thereby fluidly coupling the first flowline 90 and second flowline 92 and allowing fluid flow through the valve 102.

Similarly, to close the valve 102, the actuation of the first pump 220 may be suspended, and the second pump 224 may be actuated to supply a pressurized hydraulic fluid (e.g., oil) from the fluid reservoir 124 to the spring cavity 126 of the valve 102, as indicated by arrow 230. Specifically, in the manner described above, the second actuator 226 drives or reciprocates the piston 128 of the second pump 224, thereby producing and delivering pressurized hydraulic fluid through the conduit 127 to the spring cavity 126 of the valve 102. In the manner described below, the pressure within the spring cavity 126 may increase and exceed the pressure within the piston chamber 116 of the valve 102. Thus, the force applied by the pressurized hydraulic fluid within the spring cavity 126 may drive the piston 108, and therefore the seal 114, in the direction 112 to the closed position shown in FIG. 4. As discussed above, in the closed position, the seal 114 isolates the first flowline 90 and the second flowline 92, thereby blocking fluid flow through the valve 102.

The illustrated embodiment of the valve assembly 100 includes a recirculation circuit 232. In particular, the recirculation circuit 232 includes two pilot operated check valves (POCVs) 234. When the first pump 220 is pumping pressurized hydraulic fluid into the piston chamber 116 to open the valve 102, a first POCV 236 operates to block flow of the pressurized hydraulic fluid through a first recirculation conduit 238 that extends from the conduit 118 to the fluid reservoir 124. Similarly, when the second pump 224 is pumping pressurized hydraulic fluid into the spring cavity 126 to close the valve 102, a second POCV 240 operates to block flow of the pressurized hydraulic fluid through a second recirculation circuit 242 that extends from the conduit 127 to the fluid reservoir 124.

Additionally, a first vent path 244 extends from the conduit 118 to the second POCV 240. In operation, when the first pump 220 is pumping pressurized hydraulic fluid into the piston 116 to open the valve 102, the pressurized hydraulic fluid may flow through the first vent path 244 to vent the second POCV 240. Specifically, the pressure applied by the pressurized hydraulic fluid to the second POCV 240 may at least partially force a ball 246 of the second POCV 240 away from a seat 248 of the second POCV 240. As a result, hydraulic fluid within the conduit 127 and the spring cavity 126 may be leaked through the second recirculation circuit 242, across the second POCV 240, and back to the fluid reservoir 124. Consequently, the pressure within the spring cavity 126 may be reduced as the pressure within the piston chamber 116 is increased, thereby improving the actuation of the valve 102.

In a similar manner, a second vent path 250 may vent the first POCV 236. That is, when the second pump 224 is pumping pressurized hydraulic fluid into the spring cavity 126 to close the valve 102, the pressurized fluid may flow through the second vent path 250 to apply pressure to the first POCV 236. Specifically, the pressure applied by the hydraulic fluid through the second vent path 250 may partially at least partially force a ball 252 of the first POCV 236 away from a seat 254 of the first POCV 236, thereby allowing hydraulic fluid within the conduit 118 and the piston chamber 116 to leak through the first recirculation conduit 238, across the first POCV 236, and back to the fluid reservoir 124.

The illustrated embodiments described above may include other modifications or alternative configurations. For example, in certain embodiments, the valve 102 may have more than two positions, and therefore multiple seals 114. As such, the valve 102 may control fluid flow through more than two flowlines. The valve assembly 100 may further include other valves (e.g., reed valves, check valve, etc.) to vent trapped pressure or route hydraulic fluid within the valve assembly 100. Moreover, other embodiments may include more than two pumps 104, two actuators 106, two controllers 146, and so forth.

Embodiments of the present disclosure are directed towards a valve assembly 100 for actuating a valve 102 (e.g., a mud valve) of a downhole tool. As discussed in detail above, the valve assembly 100 is configured to be compact, small, and utilize low power (e.g., less than 10 watts). For example, the valve 102 may be actuated by the pump 104, which is driven by the actuator 106. In certain embodiments, the actuator 106 is a solenoid, piezoelectric element (e.g., a single piezoelectric element or a piezoelectric stack), or other compact actuating mechanism that uses low power. As the actuator 106 drives or reciprocates the pump 104, a hydraulic fluid (e.g., oil) is used to actuate (e.g., open or close) the valve 102. Thereafter, the valve 102 may be reset (e.g., opened or closed) by a recirculation circuit (e.g., conduit 142) or by actuation of another pump 104 (e.g., the second pump 224). Furthermore, the valve assembly 100 may be placed in a variety of different locations within a drilling or downhole tool, and the valve assembly 100 may be configured to control fluid flow in a variety of different applications. For example, the valve assembly 100 may regulate fluid flow along an internal flowline of a tool, at a flowline exit of a tool, into sampling tubes of a tool, through sensors of a tool, and so forth.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system, comprising:
   a valve assembly configured to be disposed within a downhole tool module;
   a valve of the valve assembly configured to regulate flow of a fluid within the downhole tool module, wherein the valve comprises:
   a piston;
   a seal coupled to the piston, wherein the seal is configured to block flow between a first flowline and a second flowline when the seal is in a first position and the seal is configured to enable flow between the first flowline and the second flowline when the seal is in a second position;
   a spring disposed within a spring cavity and configured to bias the piston toward a first position; and
   a piston chamber adjacent to the piston and opposite the spring cavity;
   a pump configured to supply a hydraulic fluid to actuate the valve; and
   an actuator configured to drive the pump.

2. The system of claim 1, comprising a fluid reservoir configured to supply the hydraulic fluid to the pump.

3. The system of claim 2, wherein the pump is configured to supply the hydraulic fluid to the piston chamber through a first conduit.

4. The system of claim 1, wherein the actuator is a single-crystal piezoelectric element or a stack of piezoelectric elements.

5. The system of claim 1, wherein the actuator is a solenoid.

6. The system of claim 1, wherein the pump comprises an inlet having a first reed valve configured to allow flow of the hydraulic fluid into a compression chamber of the pump and block flow of the hydraulic fluid out of the compression chamber, and an outlet having a second reed valve configured to allow flow of the hydraulic fluid out of the compression chamber and block flow of the hydraulic fluid into the compression chamber.

7. The system of claim 1, wherein the valve assembly comprises a controller configured to regulate operation of the actuator based on feedback from the valve assembly, wherein the feedback comprises a position of the valve, a power output of the pump, a flow rate of the fluid a flow rate of the hydraulic fluid, a hydraulic output pressure of the pump, or a combination thereof.

8. The system of claim 1, comprising the downhole tool module, wherein the downhole tool module comprises a probe module, a pump out module, or a sampling module.

9. The system of claim 1, comprising a downhole controller configured to regulate actuation of the actuator in response to a user input.

10. The system of claim 1, wherein the valve is configured to regulate flow of the fluid through an internal flowline of the downhole drilling module, through an exit port of the downhole drilling module, or to a sampling tube of the downhole drilling module.

11. A system, comprising:
    a downhole tool module configured to flow a fluid; and
    a valve assembly disposed within the downhole tool module and configured to regulate flow of the fluid, wherein the valve assembly comprises:
    a valve configured to block flow of the fluid between a first flowline and a second flowline when in a first valve position and enable flow of the fluid between the first flowline and the second flowline when in a second valve position, wherein the valve comprises a spring configured to bias the valve toward the first valve position;

a first pump configured to pump a hydraulic fluid to the valve to actuate the valve into the second valve position; and a first actuator configured to drive the first pump, wherein the first actuator comprises a first solenoid or a first piezoelectric stack.

* * * * *